April 29, 1930.  J. D. W. WILLIAMS  1,756,803
BERRY PICKER'S VEHICLE
Filed April 13, 1928   2 Sheets-Sheet 1
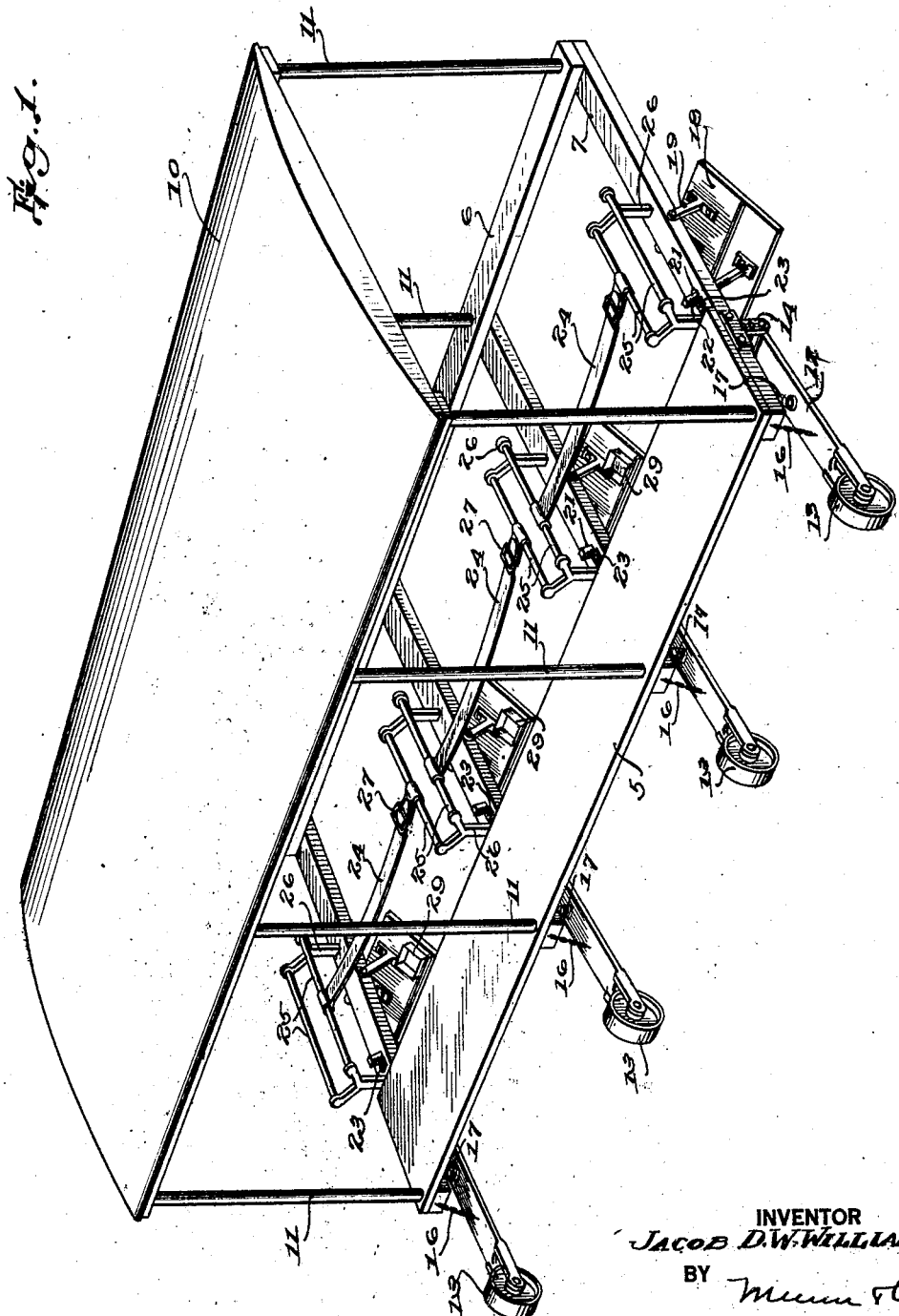
INVENTOR
JACOB D. W. WILLIAMS
BY
ATTORNEY April 29, 1930.  J. D. W. WILLIAMS  1,756,803
BERRY PICKER'S VEHICLE
Filed April 13, 1928  2 Sheets-Sheet 2
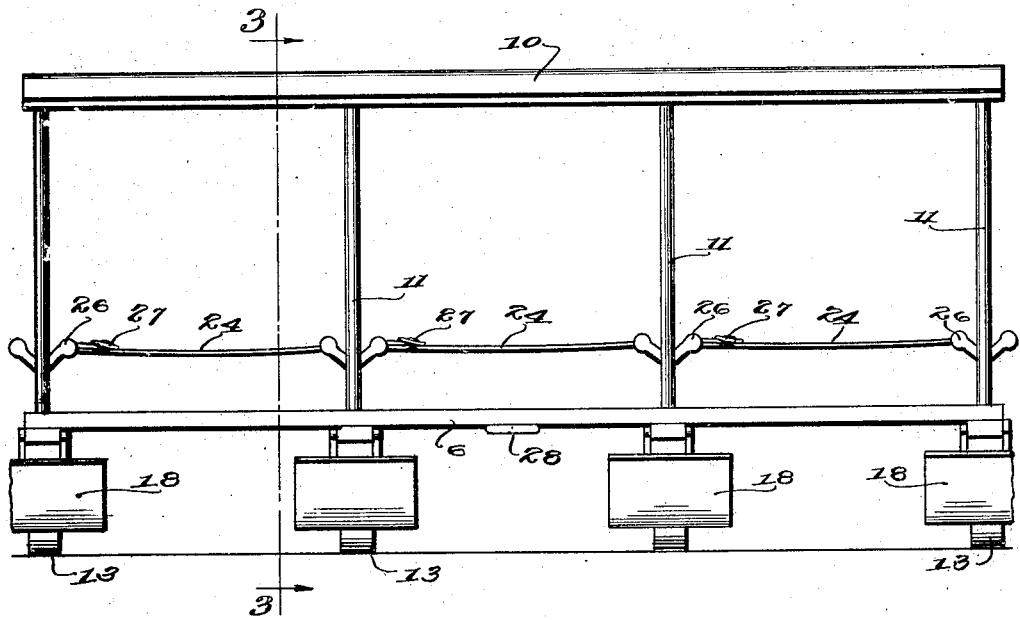
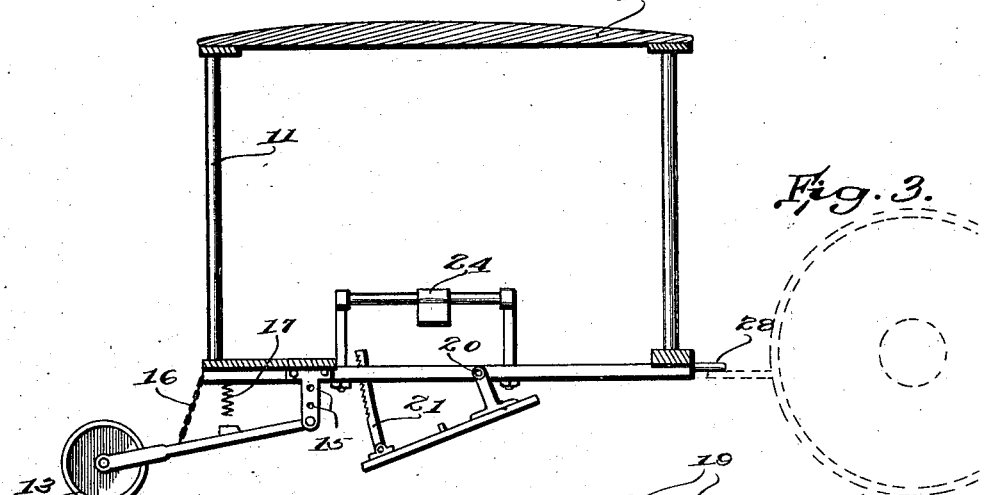
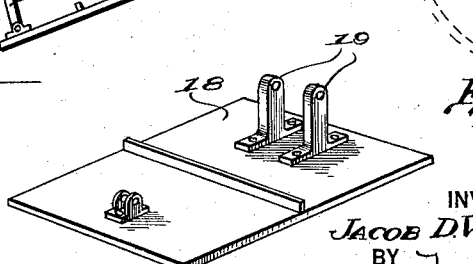
INVENTOR
JACOB D. W. WILLIAMS
BY
ATTORNEY Patented Apr. 29, 1930

1,756,803

UNITED STATES PATENT OFFICE

JACOB D. W. WILLIAMS, OF TABOR, NORTH CAROLINA

BERRY-PICKER'S VEHICLE

Application filed April 13, 1928. Serial No. 269,765.

My invention is a berry picker's vehicle and one of its objects is to provide a vehicle whereby a number of persons may be drawn over a berry patch and be supported in convenient positions for picking berries.

Further the invention provides a vehicle which will permit the berry pickers to be supported in a leaning seated position with their hands free to pick the berries and their backs relieved of strain.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a perspective of the invention,
Figure 2 is a front elevation of the same,
Figure 3 is a vertical section taken on line 3—3 of Figure 2 and illustrating the vehicle as connected with a conventional tractor, and
Figure 4 is a perspective of one of the foot rests embodied in the invention.

Referring to the invention in detail a horizontal rectangular frame is provided composed of a longitudinal seat 5, a beam 6 parallel therewith, and connected with the seat by a plurality of transverse parallel bars 7. A top 10 is arranged over the frame to protect the berry pickers from the sun, and is supported from vertical posts 11 arising from the seat and beam, respectively. To support the rear end of the frame a plurality of rearwardly extending arms 12, carrying ground engaging wheels 13 at their lower ends, are pivotally attached to longitudinally alined bearings 14 projecting downwardly from each of the bars 7 adjacent their rear ends. The bearings 14 are provided with vertically alined pivot receiving openings 15 whereby the arms may be adjusted vertically and accordingly vary the height of the frame 5. In order to prevent the pivoted arms from accidentally swinging forwardly, each of these arms is connected by a flexible element 16 secured to the rear ends of the bars 7.

To prevent the arms from striking the frame incident to the passage of the ground engaging wheels over obstructions, buffer springs 17 depend from the under faces of the transverse bars in the path of these arms and are engaged by the latter when they move towards the frame.

Pairs of foot rests 18 are arranged in longitudinal alinement in advance of the seat 5, each of which carries a pair of upstanding parallel brackets 19 upon its upper face at its forward end, which are pivotally secured to one of the transverse bars intermediate its ends by a pivot pin 20. In order to latch the foot rests in predetermined angular positions, a toothed latch bar 21 is pivoted to the upper face of each foot rest at its free end and is adjustable vertically through an opening 22 in one of the transverse bars. A keeper plate 23 is secured to the upper face of each of these bars adjacent the opening and is normally engaged by one of the latch bars.

In practice a plurality of persons or berry pickers sit upon the seat 5 with their feet resting upon the foot rests and their bodies bent forwardly. For the purpose of sustaining the weight of the berry pickers, horizontally disposed body supporting straps 24 are provided. These straps 24 are slidably adjustable on parallel rods 25 carried by pairs of longitudinally alined Y-shaped brackets 26 arising from each of the transverse bars. To permit the straps to be adjusted longitudinally to accommodate persons of different build, each of the straps is provided with a buckle 27 adjacent one end.

A clevis 28 is carried by the forward end of the frame centrally of the ends of the beam 6 and is connected with the rear end of a tractor, as illustrated in Figure 3. With the berry pickers seated upon the seat 5 and their bodies reclining on the straps 24, the vehicle is drawn slowly over the patch with the ground engaging wheels running between the rows of plants. It will be observed that both hands of each of the berry pickers are free to pick the berries from the plants so that a maximum quantity may be picked by each picker while, at the same time, the pickers are supported comfortably where they will not tire easily. As the berries are picked they are placed in cups or receptacles 29 carried on the foot rests.

What is claimed is:—

1. In combination a portable frame, to be moved over the ground, a longitudinal seat for seating a number of people, a plurality of horizontally disposed bands in advance of the seat upon which such people repose in a leaning posture, and foot rests supported from the frame.

2. In an agricultural machine, a portable frame to be moved over the ground, a horizontal seat extending the entire length of the frame at its rear end, a plurality of supports carried by the frame in advance of the seat and located above the latter, and a horizontal flexible band attached to each two adjacent supports, the bands being adapted to sustain the weight of the occupants of the seat when they are in a leaning posture.

3. In an agricultural machine, a portable frame to be moved over the ground, a horizontal seat extending the entire length of the frame at its rear end, a plurality of supports carried by the frame in advance of the seat and located above the latter, and a horizontal flexible band attached to each two adjacent supports, the bands being adapted to sustain the weight of the occupants of the seat when they are in a leaning posture, and foot rests depending from the frame below the bands.

Signed at Tabor, in the county of Columbus and State of North Carolina, this eleventh day of April A. D. one thousand nine hundred, twenty-eight.

JACOB D. W. WILLIAMS.